United States Patent [19]

Duthoo

[11] Patent Number: 5,726,418
[45] Date of Patent: Mar. 10, 1998

[54] METHOD AND INSTALLATION FOR LASER WELDING A SPACER GRID OF A FUEL ASSEMBLY FOR A NUCLEAR REACTOR, AND DEVICE FOR WELDING VIA THE INTERIOR OF A GRID

[75] Inventor: Dominique Duthoo, Romans, France

[73] Assignee: Franco-Belge de Fabrication de Combustible-FBFC, Corbevoie, France

[21] Appl. No.: 673,324

[22] Filed: Jun. 28, 1996

[30] Foreign Application Priority Data

Jun. 29, 1995 [FR] France ................ 95 07859

[51] Int. Cl.[6] .................................... B23K 26/08
[52] U.S. Cl. ................. 219/121.63; 219/121.64; 219/121.76
[58] Field of Search ............ 219/121.63, 121.64, 219/121.76, 121.77, 121.86

[56] References Cited

U.S. PATENT DOCUMENTS

| | | | |
|---|---|---|---|
| 4,492,843 | 1/1985 | Miller et al. | 219/121.63 |
| 4,492,844 | 1/1985 | Kobuck et al. | 219/121.63 |
| 4,556,776 | 12/1985 | Duncan | 219/121.63 |
| 4,636,606 | 1/1987 | Chastanet et al. | 219/121.63 |
| 4,680,443 | 7/1987 | Vere et al. | 219/121.14 |
| 4,825,032 | 4/1989 | Duncan | 219/121.63 |
| 5,179,261 | 1/1993 | Perrotti | 219/121.63 |
| 5,221,515 | 6/1993 | Thiebaut et al. | 219/121.64 |
| 5,369,242 | 11/1994 | Hatfield et al. | 219/121.63 |
| 5,371,767 | 12/1994 | Piri | 219/121.63 |

FOREIGN PATENT DOCUMENTS

| | | |
|---|---|---|
| 0 088 021 A1 | 9/1983 | France . |
| 0 104 119 A1 | 3/1984 | France . |
| 2 532 215 A1 | 3/1984 | France . |
| 0 305 944 A1 | 3/1989 | France . |
| 0 456 577 A1 | 11/1991 | France . |

OTHER PUBLICATIONS

Patent Abstracts of Japan, vol. 15, No. 30, Nov. 6, 1990, JP2-271293.

Patent Abstracts of Japan, vol. 10, No. 83, Nov. 8, 1985, JP60-223693.

Primary Examiner—Teresa J. Walberg
Assistant Examiner—Gregory L. Mills
Attorney, Agent, or Firm—Pollock, Vande Sande & Priddy

[57] ABSTRACT

A laser-beam welding device forming part of a set of at least four welding devices (13a, 13b, 13c, 13d) is introduced into each of the cells of a set of at least four cells (36a, 36b, 36c, 36d), along the axis of the cell in such a way that the welding laser beam (38a, 38b, 38c, 38d) of the welding device is aligned with an edge of the cell (36a, 36b, 36c, 36d). A laser-beam weld is simultaneously produced along at least a part of the length of an edge of each of the cells (36a, 36b, 36c, 36d) of the set of cells and relative displacement between the grid (35) and the welding devices (13a, 13b, 13c, 13d) is carried out in order to introduce the welding devices into at least four new cells of the grid which are arranged in a square. The invention also relates to a device for welding a grid via the interior of the cells of the grid and to an installation for fast welding of a grid.

13 Claims, 5 Drawing Sheets

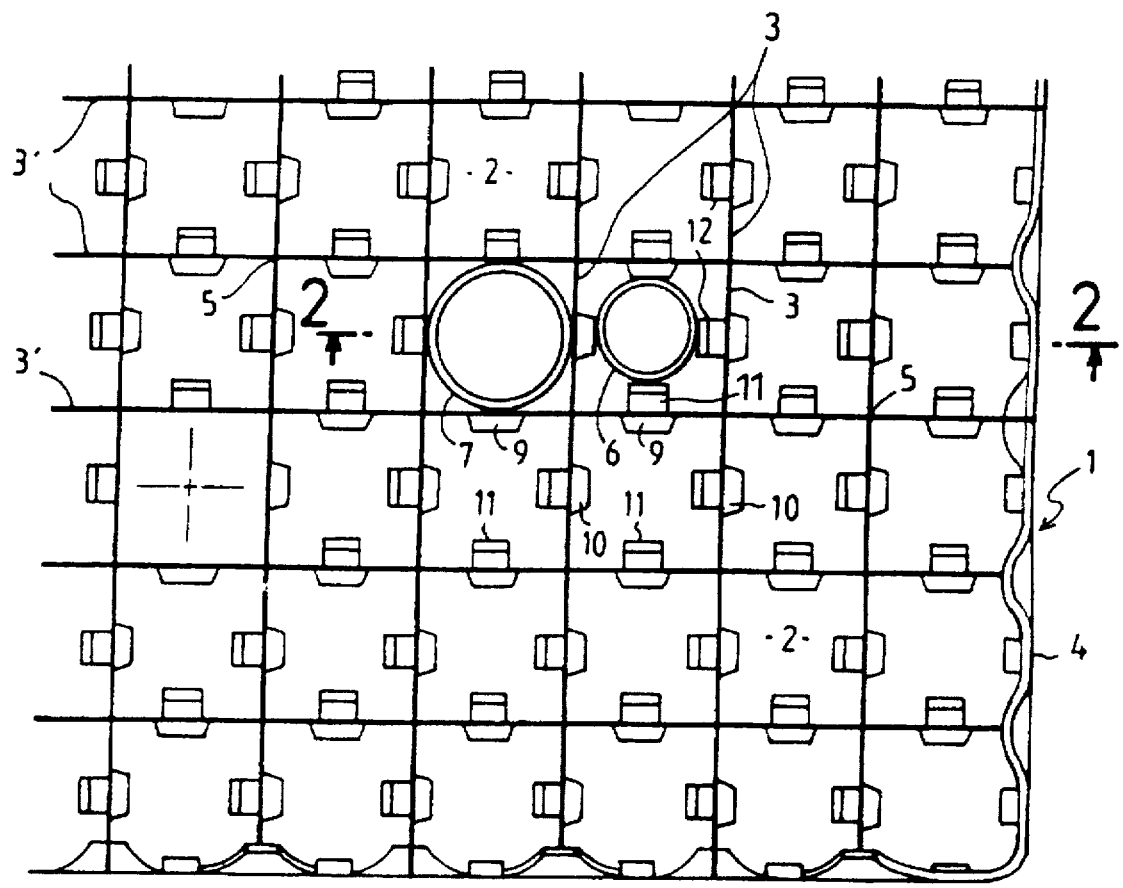
FIG.1
FIG.2
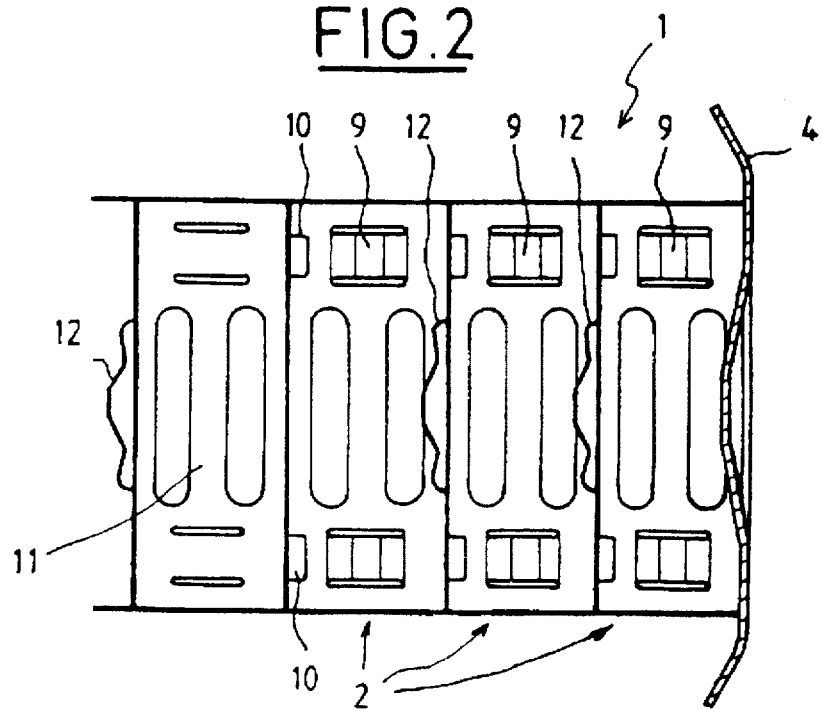

3,726,418

METHOD AND INSTALLATION FOR LASER WELDING A SPACER GRID OF A FUEL ASSEMBLY FOR A NUCLEAR REACTOR, AND DEVICE FOR WELDING VIA THE INTERIOR OF A GRID

FIELD OF THE INVENTION

The invention relates to a method and a device for welding interlaced straps of a spacer grid of a fuel assembly for a nuclear reactor.

BACKGROUND OF THE INVENTION

Fuel assemblies for a nuclear reactor, and in particular for nuclear reactors cooled by pressurized water, include a bundle of long cylindrical fuel elements called rods, which are held inside a framework of the fuel assembly in an arrangement in which the rods are all mutually parallel.

The framework of the fuel assembly consists of spacer grids comprising cells arranged in a regular lattice intended to hold the rods of the fuel assembly transversely, guide tubes which are engaged in some cells of the spacer grids and which are longer than the fuel rods, and end nozzles, fixed on the ends of the guide tubes, which stiffen the framework and hold the fuel rods.

The spacer grids are distributed along the length of the guide tubes, at regular intervals, in order to hold the rods of the bundle in transverse planes, in a lattice identical to the lattice of the cells of the spacer grids.

The spacer grids include prismatic cells which generally are of square cross-section and which are intended to receive either a fuel rod or a guide tube of the framework.

The spacer grids generally consist of interlaced metal straps arranged in two directions at 90° and defining parallelepipedal cells of square cross-section which are intended to receive the fuel rods and the guide tubes of the assembly. Each of the straps of the lattice with square units, constituting the spacer grid, intersects all the straps arranged in a direction at 90° to the strap. Each of the intersections of two straps constitutes a cross-brace having four dihedral angles at 90° and a junction edge common to four cells of the grid. The straps are assembled by interlocking and then welding along the junction edges common to four cells of the grid.

Generally, in order to assemble the straps constituting a cross-brace along an edge, the straps are engaged on one another by means of a slot occupying half the width of the strap.

First of all, the grid is assembled by engaging the straps with one another in the square-unit lattice of the grid and by assembling the peripheral belt of the grid. The straps are then welded to one another at the intersection points of the straps at the end of the edges and the peripheral straps of the grid, constituting an external belt which closes the peripheral cells of the grid, are welded. The cells of the spacer grids have a dimension such that the fuel rods are engaged with fairly large clearance inside the cells. In order to hold the fuel rods inside the cells of the grid, holding means are used which project into each of the cells. These holding means may consist of dimples obtained by cutting the metal of the straps and pushing it into the cells, and of springs which may be attached to the walls of the cells consisting of parts of the straps, or formed by cutting and pushing in the metal of the straps.

The guide tubes are introduced virtually without clearance inside the cells of the spacer grids, and can be fixed by welding to some grids of the fuel assembly.

In a spacer grid for a conventional fuel assembly, each of the cells may include, for example, two sets of two dimples on two adjacent walls and two springs on two other adjacent walls, located opposite the dimples. In the cells of such a spacer grid, the fuel rod is pushed by each of the springs onto the two dimples located opposite such spring.

During assembly and welding of the spacer grid, the straps which are assembled with one another include the dimples and springs intended to project inside each of the cells of the grid. The straps furthermore include other parts which are cut and pushed in, such as tongues or lugs improving the rigidity and the strength of the assembled grid.

It may be necessary and advantageous to weld together the straps of the spacer grid at each of their edges which constitutes the edge of a cross-brace formed by two strap parts assembled together.

One of the problems encountered when welding the spacer grids of the fuel assemblies relates to heating of the straps due to the welding, which may cause deformations of the grid and the appearance of stresses.

Various methods for successively welding the edges of a spacer grid have been proposed, making it possible to limit as far as possible the stresses and the deformations suffered by the grid as a result of the heating due to the welding.

For example, a patent application filed on the same day as the present application proposes a spacer grid for a fuel assembly, in which the cross-braces are successively welded in two bisector planes at 90° of the dihedra constituting a cross-brace. The successive cross-braces arranged along the length of a strap of the grid include successive welds, along a part of the length of the edge of the cross-brace in the vicinity of one of the faces of the grid, which are aligned along a first bisector plane of two dihedra of the cross-brace, then, for the succeeding cross-brace, along a second bisector plane of two dihedra of the second cross-brace, at 90° to the first.

The welds in the vicinity of the second face of the grid on each of the edges of the cells are made in bisector planes at 90° to the bisector planes in which the welds of the edges in the vicinity of the first face of the grid are located.

Such a method makes it possible substantially to limit the stresses and the deformations suffered by the grid during welding, because of the distribution of the weld lines around a given cell of the grid and at each of the ends of the cell arranged in the vicinity of a face of the grid.

A laser-beam welding method is also particularly well suited to the welding of relatively thin straps and, in particular, to welding along the edges of the cells whose cross-section is small (for example of the order of (1×1) cm$^2$).

One problem linked with the manufacture of spacer grids of fuel assemblies relates to the length of time for performing the welding, because of the very large number of welds to be produced.

In the case of the method mentioned above, it is necessary to make four welds along each of the edges of each of the cells, because the welds are made successively in each of the bisector planes of the four dihedra of each of the cross-braces.

As a result, in the case of a grid including 16×16 cross-braces, the number of welds to be produced for all the cross-braces of the grid is 4×16×16=1024 welds.

It is therefore desirable to have available a welding method which both makes it possible to make the welds in a sequence which minimizes the appearance of stresses and deformations in the grid, and which does so in the shortest possible total welding time for the entire grid.

Furthermore, since prior art techniques for laser welding of spacer grids of fuel assemblies are carried out by aligning a laser beam on one end of an edge of the grid, from outside the grid, they require precise optical guiding of the laser beam and focusing on the zone to be welded. Thus, these techniques are unsuitable for welding the edge portions of the grid in well-defined directions, inside the dihedra of the cells.

SUMMARY OF THE INVENTION

The object of the invention is to provide a method for welding interlaced straps of a spacer grid of a fuel assembly for a nuclear reactor, defining juxtaposed prismatic cells constituting a lattice in which a set of adjacent cells have a common edge along which at least two straps constituting a cross-brace are welded. This method makes it possible to carry out welding sequences capable of limiting heating, stresses and deformation suffered by the grid during welding and to produce all the welds of a spacer grid in a short time, i.e., at limited cost.

To this end:

- a laser-beam welding device forming a part of a set of at least four welding devices is introduced into each of the cells of a set of at least four cells, along the axis of the cell, in such a way that the set of at least four welding devices aligns a welding laser beam with at least four edges of the grid,
- at least four laser-beam welds are made simultaneously along at least part of the length of the four edges, and
- relative movement between the grid and the set of laser-beam welding devices is carried out in order to introduce the welding devices into at least four new cells of the grid.

The invention also relates to a device for welding the straps of a spacer grid via the interior of the prismatic cells of the grid and to an installation for fast welding of the straps of spacer grids.

BRIEF DESCRIPTION OF THE DRAWINGS

In order to explain the invention clearly, a description will now be given, by way of example, with reference to the appended drawings, of two embodiments of a welding method according to the invention and of a welding device making it possible to implement the method.

FIG. 1 is a plan view of a part of a spacer grid of a fuel assembly for a pressurized water nuclear reactor.

FIG. 2 is a view in vertical section along line 2—2 of FIG. 1.

DESCRIPTION OF THE PREFERRED EMBODIMENTS

Figure 3:
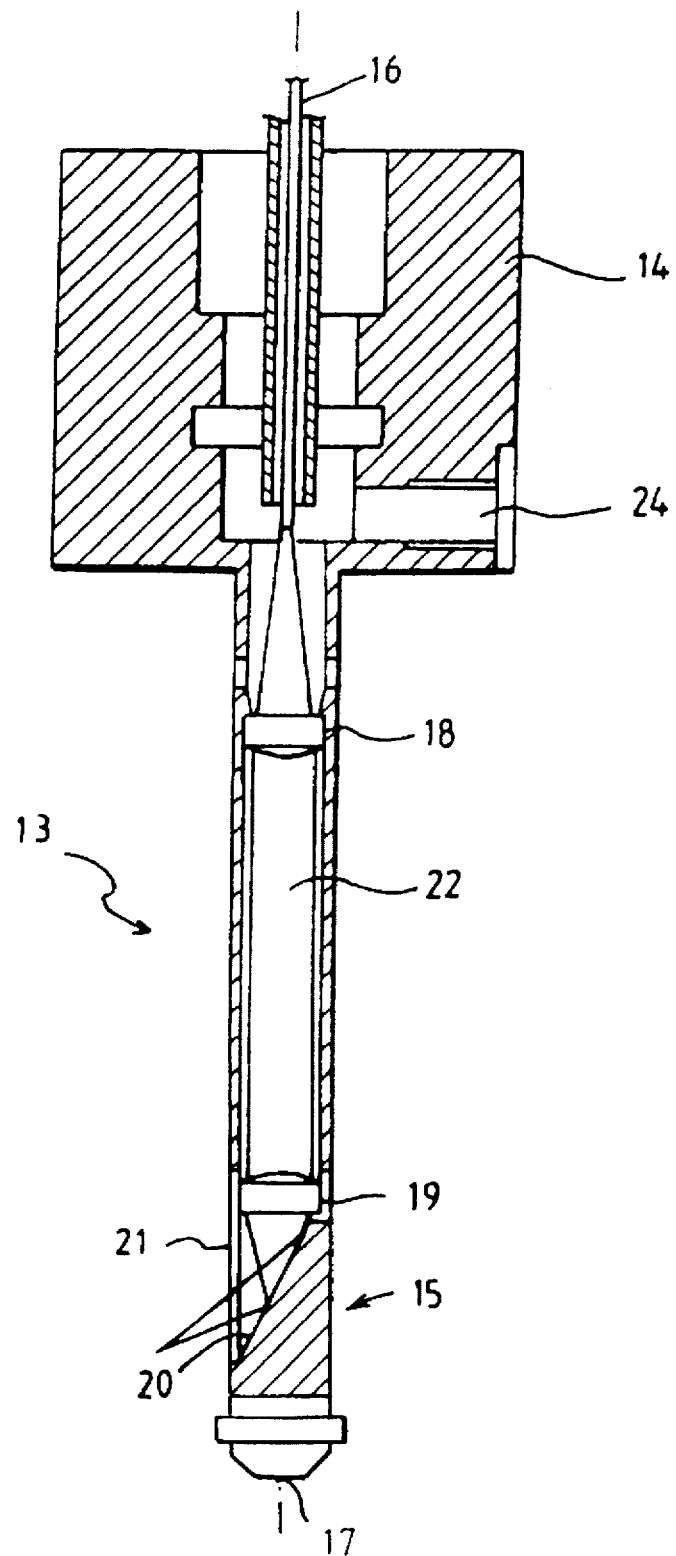
FIG. 3 is a view in axial section of a laser-beam welding device which can be used for implementing the method according to the invention.

FIGS. 1 and 2 show a part of a spacer grid 1 of a fuel assembly for a pressurized water nuclear reactor.

The grid 1 includes a set of parallelepipedal cells 2 of square cross-section, arranged in the lattice with square units represented in FIG. 1.

The grid consists of interlaced metal straps, a first set of straps 3, all mutually parallel, extending in a first direction and a second set of straps 3', all mutually parallel, extending in a second direction at 90° to the direction of the straps 3. Each of the cells 2 of the grid is defined by two successive straps of the set of straps 3 and two successive straps of the set of straps 3'.

The peripheral cells of the spacer grid include an outer wall consisting of a part of the peripheral belt 4 of the spacer grid. The straps of the sets 3 and 3' include assembly slots, the length of which is equal to half the width of the strap and which are spaced along the length of the strap at a distance corresponding to the side of a cell 2. The straps are assembled together at the parts which include the slots, so that they constitute cross-braces which include four dihedra at 90°, having a common edge 5 constituting an edge common to four parallelepipedal cells 2 with square base.

The cells 2 of the grid are intended to receive either a fuel rod 6 or a guide tube 7.

The fuel rods 6 have a diameter substantially less than the side of a cell, so that a clearance is left between the rod 6 introduced into a cell 2 and the walls of the cell which consist of parts of the straps 3 and 3'.

In order to hold the fuel rods 6 inside a cell 2 of the grid, two sets of two stops 9 and 10, arranged on two adjacent walls of the cell 2, are produced by cutting and pushing in two walls of the cell 2.

Two springs 11 and 12 are respectively provided on those walls of the cell 2 arranged opposite the two walls including the stops 9 and 10. As a result, the rod 6 is held in contact against the two stop assemblies 9 and 10 by the springs 11 and 12. The springs 11 and 12 can be produced by cutting and pushing in the metal of the walls of the cell 2 or can be attached to the walls of the cells and fixed by engagement and welding in openings in the walls.

FIGS. 1 and 2 represent a grid including springs produced by cutting and pushing in the metal of the walls of the cells 2. In this case, each of the cell walls includes two oblong slots between which a spring 11 or 12 is produced.

The grid 1 as represented in FIGS. 1 and 2 may, for example, be an end grid of a fuel assembly made of martensitic steel, in which the dimples and the springs are made from the metal of the walls of the grid made of heat-treated martensitic steel.

The guide tubes 7, the diameter of which is substantially greater than the diameter of the fuel rods, are introduced virtually without clearance inside the cells 2 of the grid. In the case of a lower end grid of a fuel assembly made of martensitic steel, the tubes 7 can be fixed on the grid so as to stiffen the framework of the assembly.

Another type of spacer grid for a fuel assembly consists of straps made of a material which is a weak neutron absorber, for example a zirconium alloy such as Zircaloy 4. In this case, the dimples are made by cutting and pushing in the zirconium alloy walls of the cells of the grid, and the springs are steel or treated nickel alloy springs attached onto the wall of the cells.

In all cases, the cross-braces of the grid are welded in the same way, in a welding sequence carried out successively in the various bisector planes of the cross-braces.

One particularly advantageous method for welding the cross-braces of a fuel assembly spacer grid employs a laser beam.

FIG. 3 represents a laser-beam welding device 13 which can be used for welding the cross-braces of a preassembled spacer grid via the interior of the cells of the grid.

The device 13, includes a support 14 and a hollow cylindrical body 15, the external diameter of which is small enough to permit the body 15 to be introduced axially into a prismatic cell of a grid. In the case of a grid with square units, the diameter of the body 15 of the welding device is less than the length of the side of a cell of the grid.

The support 14 is pierced by a bore in axial extension of a bore of the cylindrical body 15 made in tubular form. The bore of the body 15, in which an optical device for supplying power laser radiation and an optical fiber 16 having one end located in the entry part of the body 15 are mounted, lies in axial extension of the body 15 of the welding device. The axis common to the bore of the support 14 and to the cylindrical body 15 constitutes the axis of the welding device 13, called a laser-beam welding rod.

A set of collimating lenses 18 and a set of focusing lenses 19 are arranged inside the tubular part of the body 15.

A polished copper mirror 20, inclined relative to the axis 17 of the body 15 of the welding rod 13, is arranged at the end of the tubular part of the body 15 opposite the support 14.

An optical window 21 passes through the wall of the tubular part of the body 15.

The end of the optical fiber 16 is arranged in the vicinity of the focus of the set of collimating lenses 18, so that, when the fiber 16 is supplied with power laser radiation, a parallel laser beam 22 propagates in the tubular part of the body 15 and passes through the focusing lenses before being reflected by the surface of the mirror 20 so as to pass through the window 21. The lenses 19 make it possible to focus the beam at a precise point outside the body 15 of the welding rod 13. The set of optical elements 18, 19, 20 guides the laser beam, in the central passage of the hollow cylindrical body 15, between the entry part of the body 15 and the optical window 21, then to the welding zone.

When the body 15 of the welding rod 13 is introduced into a cell of a spacer grid of a fuel assembly, in the axial direction of the cell, i.e., in such a way that the axis 17 of the welding rod 13 coincides with the axis of the cell perpendicular to the faces of the spacer grid, the welding rod is oriented in such a way that the laser beam 22 is concurrent with an edge 5 along which it is desired to produce a weld. Furthermore, the optical characteristics of the focusing lenses 19 are such that the beam 22 is focused practically on the edge 5, so that the focal spot of the laser beam 22 on the edge along the intersection of two straps 3 and 3' is very small.

Figure 5:
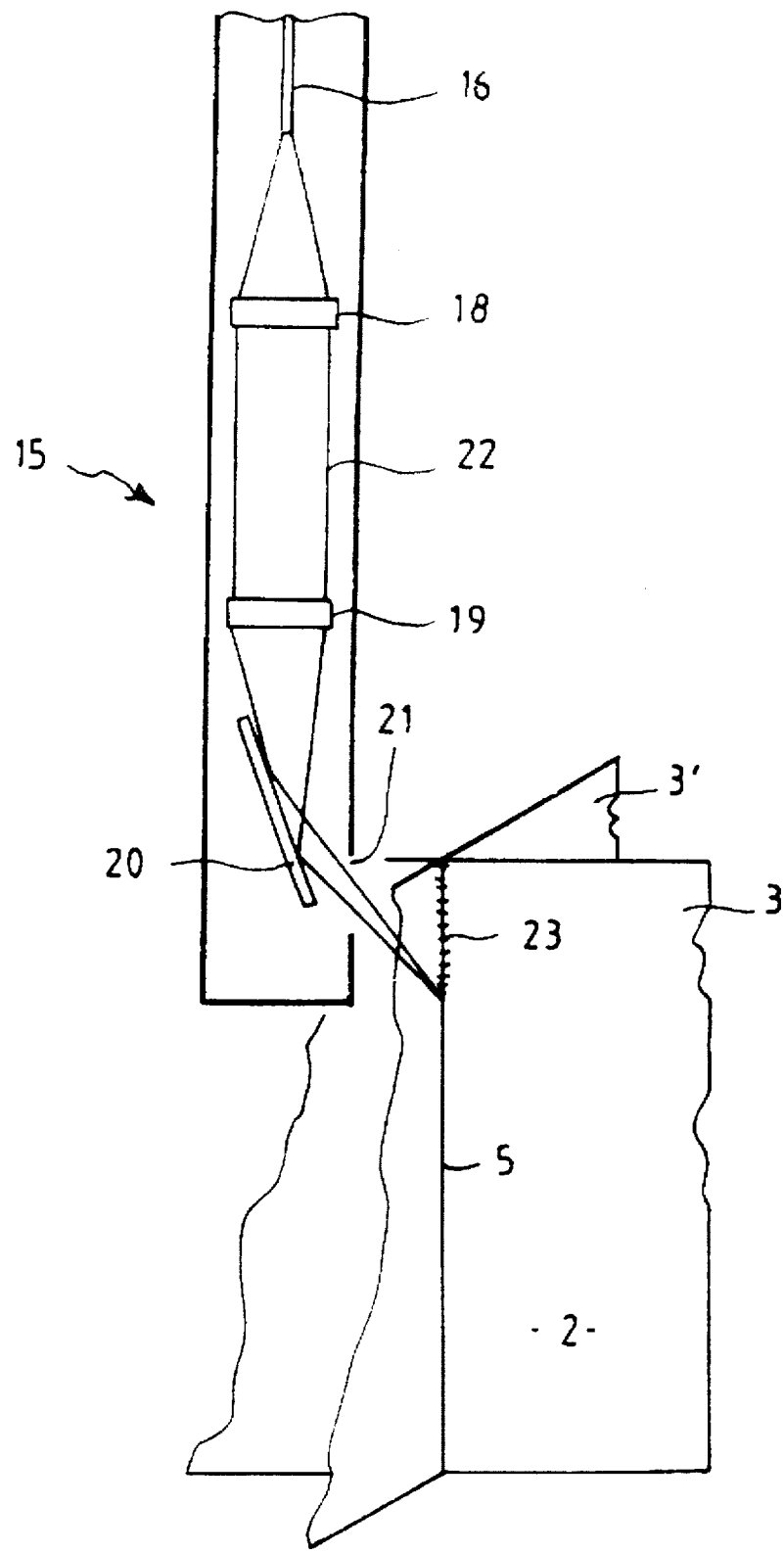
FIG. 5 is a schematic perspective view of a welding device carrying out laser-beam welding of an edge of a cross-brace of a fuel assembly spacer grid.

FIG. 5 schematically represents the body 15 of a welding rod 13 introduced into a cell 2 of a fuel assembly, along the axis of the cell, so as to weld the edge 5 of a cross-brace constituted by the intersection of two straps 3 and 3'.

The optical fiber 16 supplies, at its end located at the entry of the body 15 of the welding rod, laser radiation at a point close to the focus of the set of collimating lenses 18. The parallel laser beam 22 produced by the collimating lenses is focused by the set of focusing lenses 19 and reflected by the mirror 20, in such a way that it emerges through the window 21 of the body 15 of the welding rod. The body 15 of the welding rod is oriented in such a way that the beam 22 is concurrent with the edge 5 of the cross-brace constituted by the straps 3 and 3' assembled together at a right angle. The beam 22 is furthermore focused practically on the edge 5. The energy conveyed by the power laser beam makes it possible to melt the metal of the straps 3 and 3' at the edge 5. Moving the welding rod 15 in the direction of the axis of the cell 2 makes it possible to produce a weld line 23 along a part of the length of the edge 5, starting from one of the faces of the spacer grid.

The preassembled spacer grid is generally placed in a horizontal arrangement and the laser-beam welding of the cross-braces of the grid is carried out along a part of the length of the edge of the cross-brace, starting from the upper face of the preassembled spacer grid which is laid flat, and over a certain length of the junction edge, starting from the lower face of the preassembled spacer grid which is laid flat.

The laser welding beam 22 is aligned substantially on a diametrical plane of a dihedron formed by the straps 3 and 3', in order to produce high-quality welding of the straps 3 and 3'.

As shown in FIG. 3, the body 14 of the welding rod 13 includes a nozzle 24 for supplying inert gas, making it possible to send a stream of inert gas into the welding zone where the metal of the straps has been melted by the laser beam.

Figure 4:
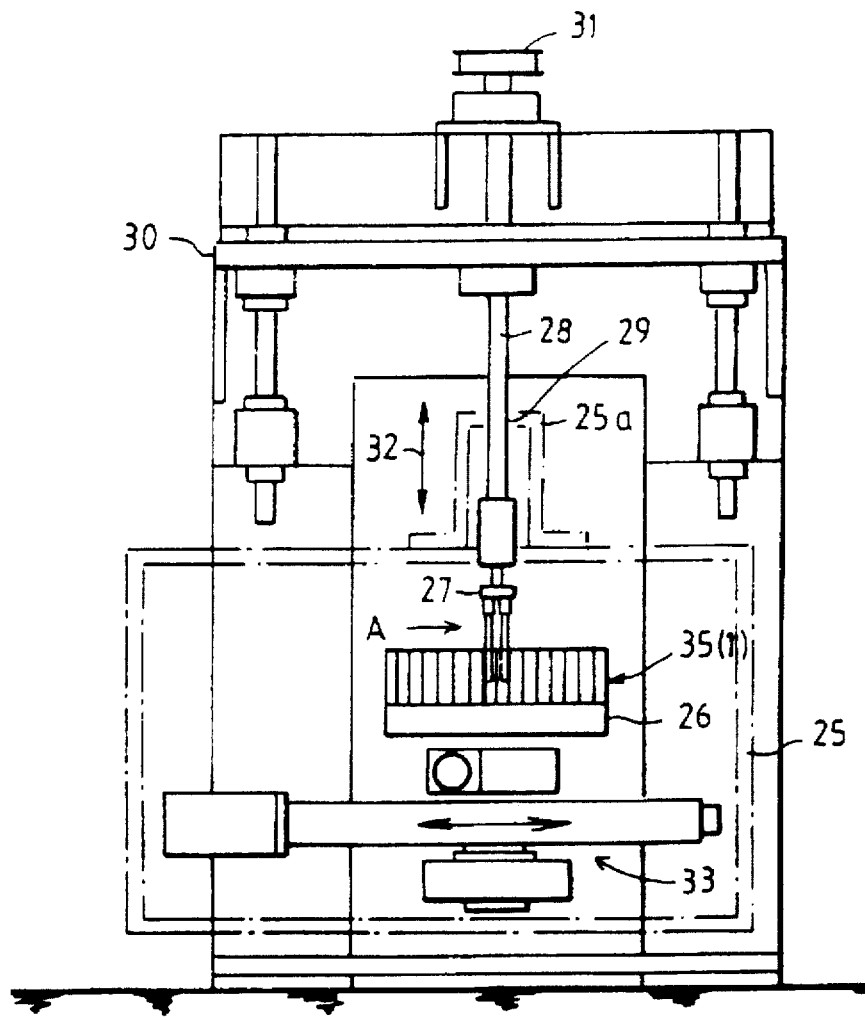
FIG. 4 is a view in elevation of a welding installation for implementing the method according to the invention.

FIG. 4 represents a welding installation which can be used for implementing the welding method according to the invention.

The welding installation represented in FIG. 4 includes an enclosure 25 in which an inert gas atmosphere can be created in order to weld a preassembled spacer grid 1 which is arranged horizontally on a support 26, inside the enclosure 25 of the welding installation. The axes of the cells of the grid are then vertical.

The welding installation mainly includes a welding head 27 fixed to the end of a hollow shaft 28 which passes slidably and, in leaktight fashion via a seal 29, through a penetration sleeve 25a of the enclosure 25.

The hollow shaft 28 bearing the welding head 27 at its lower end is connected, at its upper end, to a plate 30 which can be moved in the vertical direction by a displacement means 31 including a motor driving a displacement screw assembly. It is thus possible to obtain vertical movement, in both directions, of the hollow shaft 28 and of the welding head 27, as represented by the double arrow 32.

The horizontal support 26 of the grid 1 is itself borne by a crossed-carriage displacement assembly 33 arranged inside the enclosure 25, making it possible to move the grid in two directions at 90° in the horizontal plane.

Figure 4A:
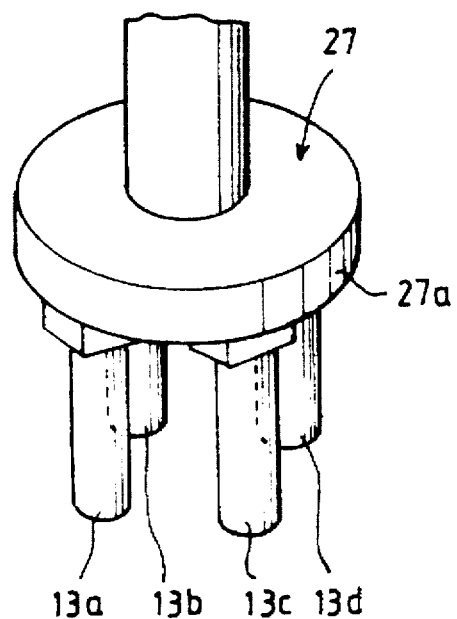
FIG. 4A is a perspective view of the detail A of FIG. 4, representing the welding head.

FIG. 4A shows, on a larger scale, the welding head 27 which includes a support 27a on which four welding rods 13a, 13b, 13c, 13d, similar to the welding rod 13 represented in FIGS. 3 and 5, are fixed.

The welding rods 13a, 13b, 13c and 13d are fixed to the support 27a of the welding head 27 in such a way that their axes constitute four parallel edges of a parallelepiped of square cross-section, the side of which is equal to the side of a cell of the grid to be welded or to a multiple of such side.

Figure 6:
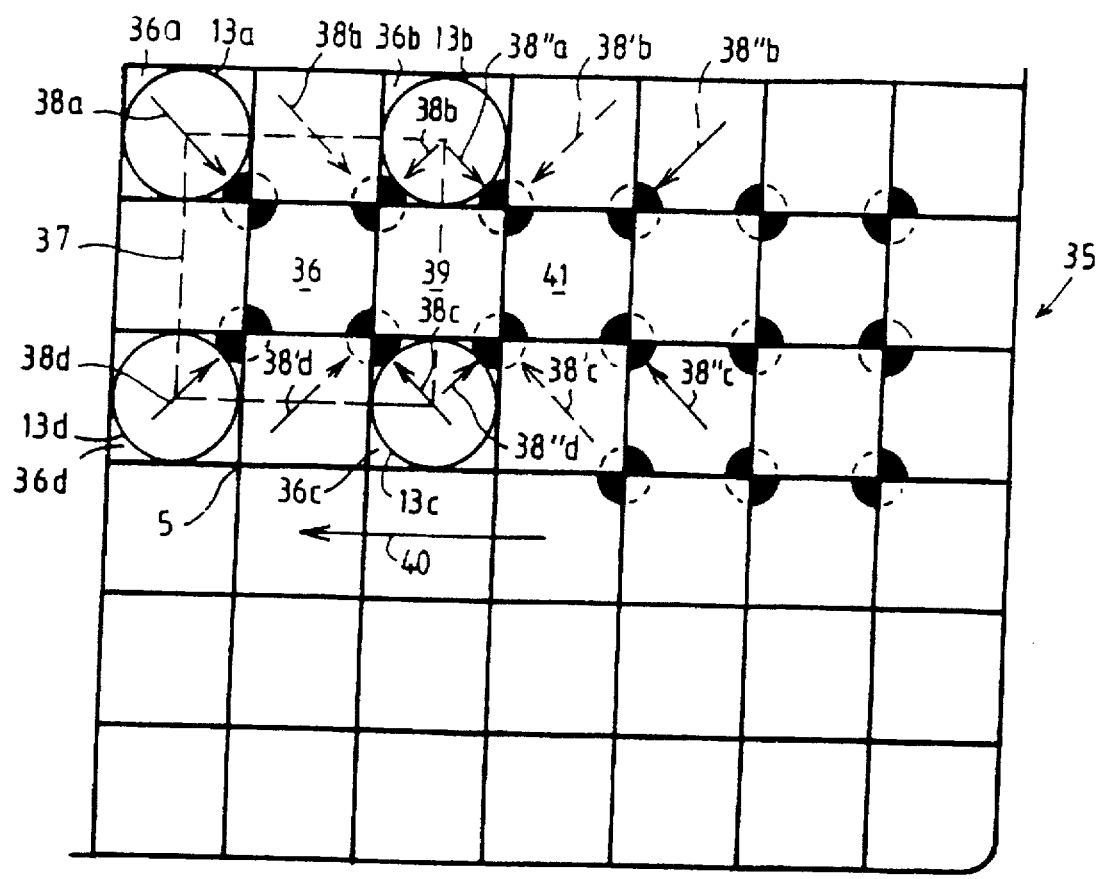
FIG. 6 is a schematic plan view of a fuel assembly grid, showing a sequence of welding the cross-braces of the grid, during implementation of a first embodiment of the method according to the invention.

FIG. 6 schematically represents a welding sequence which can be implemented by using a welding head 27, the four welding devices 13a, 13b, 13c and 13d of which are placed in a square arrangement, the side of which is equal to twice the side of a cell of the grid.

The four welding devices of the welding head can be introduced simultaneously into four cells 36a, 36b, 36c, 36d of the grid 35 represented in FIG. 6.

In order to introduce the laser-beam welding devices into the four cells 36a, 36b, 36c, 36d, the grid is placed, by moving the crossed carriages 33, in a position such that the axes of four cells 36a, 36b, 36c, 36d surrounding a cell 36 of the grid are in alignment with the axes of the welding rods 13a, 13b, 13c, 13d of the welding head 27.

The welding head is then moved vertically downward to introduce the welding rods into the four cells surrounding the cell 36, as represented in FIG. 6.

The rods 13a, 13b, 13c, 13d are fixed on the support 27a of the head 27 in such a way that the body of each of the rods introduced into a cell is oriented so as to align a welding laser beam with a bisector plane of the cell, containing a diagonal of the square around which the four welding rods are arranged.

Referring to FIG. 6, it is seen that the axes of the welding rods 13a, 13b, 13c and 13d constitute the edges of a parallelepiped, the square base 37 of which is shown in dotted lines. For the sake of simplification, it will be indicated below that the welding rods are arranged around the square 37, the side of which is equal to twice the side of a cell.

FIG. 6 also indicates the four directions 38a, 38b, 38c and 38d of the four welding laser beams produced by the four welding rods introduced into the spacer grid. The four welding directions 38a, 38b, 38c and 38d each lie in a bisector plane of two opposite dihedra of one of the four cross-braces, the edges of which are constituted by the four edges of the cell 36. Each of the bisector planes is common to a dihedron of the cell in which the welding rod is engaged and to a dihedron of the cell 36.

The edges of the cell 36 are therefore welded starting from four cells surrounding the cell 36 and each including a cross-brace, and an edge, both common with the cell 36.

In order to start the laser-beam welding operation, the four welding rods of the welding head are introduced into the four cells surrounding the cell 36, so that the laser beam is aligned and focused on a part of the edge of the cell 36, arranged in the vicinity of the upper face of the grid 35 which is laid horizontally flat on the support 26 of the welding installation.

Welding is carried out by the laser beams aligned with the directions 38a, 38b, 38c and 38d, simultaneously over a portion of the length of the four edges of the cell 36, starting from the upper face of the grid 35. Partial welding of the edge, in its upper part and from the outside of the cell 36, is therefore carried out.

The welds produced may be either continuous and in the form of a continuous weld bead along a part of the edge of the cell 36, or discontinuous and in the form of joints or weld zones spaced along the length of the edge of the cell 36.

After this first series of four welds has been produced, the welding head 27 is moved vertically upwards in order to extract the welding rods from the four cells 36a, 36b, 36c and 36d.

It is then possible to move the grid 35 by one spacing in the direction of the horizontal rows of cells. The welding rods of the Welding head are then plumb with four cells which surround the cell 39 next to the cell 36 in the horizontal row of cells and each have a dihedron opposite a dihedron of the cell 39.

The welding head is then moved vertically downwards so as to place the four welding rods inside the four cells surrounding the cell 39.

The welding laser beams produced by the four welding rods are then aligned, as indicated by the broken arrows 38'a, 38'b, 38'c and 38'd.

In order to carry out the welding process as described above, the welding heads are moved inside the cells surrounding the cell 39, so as to weld a lower part of the edges of the cell 39, starting from the lower face of the grid 35.

It is also possible, after producing the first four welds around the cell 36, to move the grid 35 by two spacings in the direction of a horizontal row and in the direction indicated by the arrow 40.

The four welding devices are then plumb with four cells which surround the cell 41 and which each have an edge common with the cell 41 and a dihedron opposite a dihedron of the cell 41.

When the welding devices are introduced simultaneously into the four cells surrounding the cell 41, the welding directions of the laser beams of the four welding devices are those represented by the solid arrows 38"a, 38"b, 38"c and 38"d. The upper part of each of the edges of the cell 41 can then be welded from the outside. The upper parts of the edges of the cell 39, two of which are common with the cell 36 and the other two edges of which are common with the cell 41, are therefore welded during two successive welding passes, separated by movement of the grid 35 by two spacings of the square-unit lattice. All the upper parts of the edges of three successive cells in a horizontal row are therefore welded in two successive operations.

It is therefore possible successively to produce all the welds of the upper parts of the edges of the cells (represented in black) in a row of the grid.

All the welds of the upper parts of the edges of the cells can be produced successively, four by four, by successive movements of the grid by two spacings in a horizontal direction or in a vertical direction.

It is also possible to produce preferably all the welds of the upper parts and the welds of the lower parts (represented by dashes) of the edges of the grid by successive movements of the grid by one spacing in the direction of the horizontal rows and in the direction of the vertical rows, by successively placing the welding rods, after movement by one spacing of the grid 35, opposite the upper part and opposite the lower part of the edges of the grid.

In practice, a sweep over all the cells of the grid is not carried out row by row, but in such a way as to produce a spiral movement of the welding heads relative to the grid, starting from the center of the grid. This limits deformations of the grid due to heating during welding.

It is thus possible to produce all the welds of the grid in an automated and rapid manner, these welds being produced four by four and in a perfectly defined sequence, which can be automated.

Figure 7:
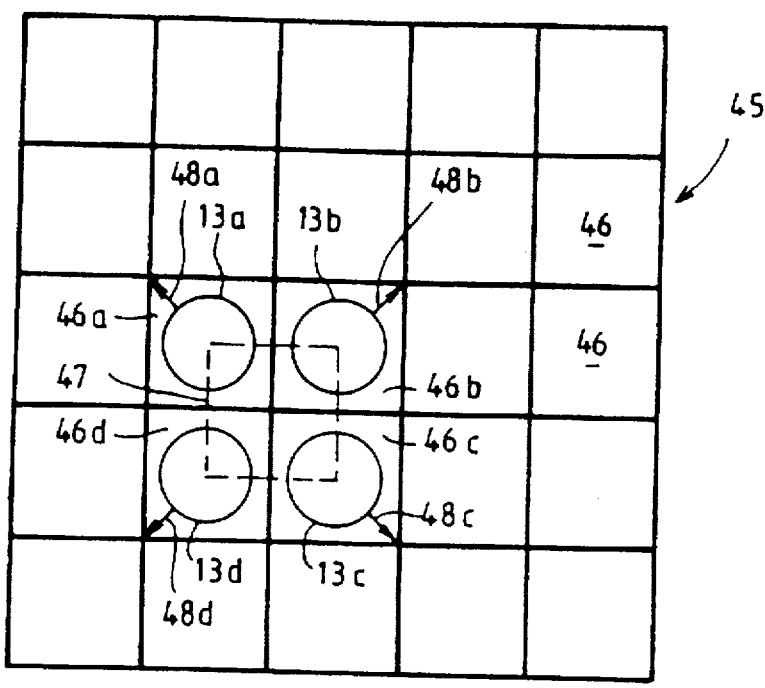
FIG. 7 is a plan view similar to FIG. 6, showing a welding sequence being carried out during implementation of the method according to a second embodiment of the invention.

As shown in FIG. 7, it is possible to use an arrangement of the welding devices or rods on the welding head such that the axes of the four rods constitute the edges of a parallelepiped, the base of which has the shape of a square whose side is the side of a cell.

FIG. 7 represents a portion of a grid 45 in which laser-beam welding of the edges of the cells 46 of the grid has been carried out by using a welding head, the four welding rods 13a, 13b, 13c and 13d of which are arranged around a square 47, the side of which is equal to the side of a cell 46 of the grid.

The four devices 13a, 13b, 13c and 13d are introduced simultaneously into four adjacent cells 46a, 46b, 46c and 46d, the axes of which are arranged along the edges of a parallelepiped with square base, the side of which is equal to the side of a cell.

FIG. 7 also represents the directions 48a, 48b, 48c and 48d of the four laser-welding beams of the four welding devices 13a, 13b, 13c and 13d. The laser-welding beams 48a, 48b, 48c, 48d are aligned along a bisector plane of each of the cells into which the welding rod is introduced, this bisector plane containing a diagonal of the square 47 around which the welding heads are arranged. It is possible to weld four edges of the four cells 46a, 46b, 46c and 46d simultaneously.

By successive movements of the grid in the directions of the rows of cells, between two welding operations, and introduction of the welding rods into successive sets of four cells, it is possible to produce all the welds of the edges of the grid.

It is possible to produce the welds adjacent the first and second grid faces successively by moving the grid by one spacing between two welding operations.

In all cases, the welding operations can be carried out in a completely automated manner and in a reduced operating time.

It is possible to produce all the welds of the edges of the grid without having to invert the grid, by introducing the welding devices into the cells through one or through both faces of the grid. A weld bead can be produced at any location along a shaft of the grid. The welding device or rod can pass freely inside the cell in which the welding is carried out or can be self-centered by the dimples and springs projecting from the walls of the cell.

The various welding devices of the welding installation, each producing one power laser beam, may each be supplied from an independent laser source or in grouped fashion, via one or more sources and multiplexer devices.

The arrangements of the welding rods of the welding head, and the welding sequences suited to the arrangement of these electrodes, may differ from those which have been described.

It is possible to produce the relative movements between the grid and the welding head, in directions perpendicular to the axis of the cells, in a different manner. Instead of moving the grid on a crossed-movement table, it is possible to leave the grid stationary and move only the welding head.

It is also conceivable to move the welding head in directions corresponding to diagonals of the cells and of the grid.

The invention applies to welding any spacer grid for a fuel assembly which includes parallelepipedal cells constituting a square-unit lattice.

It would of course also be possible to modify the welding head the sequences for moving the grid or the welding head, in order to weld a grid whose cells are arranged in any shape of lattice.

It would also be possible to arrange the grid vertically, for example in an edgewise position, to say such that it rests on a support via one of the sides of the belt, and to place at least one welding head, including four welding rods, laterally relative to the grid. The welding devices or rods can be placed along the edges of a parallelepiped, the square base of which has a side which is any integer multiple of the side of a cell of the grid. When implementing the method, the welding devices are then introduced into four cells arranged in a square, the side of which is an integer multiple of the side of a cell of the grid.

I claim:

1. A method for welding interlaced straps of a spacer grid of a fuel assembly for a nuclear reactor, defining juxtaposed prismatic cells constituting a lattice in which a set of adjacent cells have a common edge along which at least two straps, constituting a cross-brace, are assembled and welded, said method comprising the steps of
   (a) introducing a laser-beam welding device forming part of a set of at least four laser-beam welding devices into each cell of a set of at least four cells along an axis of the cell, such that the set of at least four welding devices aligns at least four welding laser beams with at least four edges of the grid;
   (b) performing at least four laser-beam welds simultaneously along at least part of the length of the four edges; and
   (c) carrying out relative movement between the grid and the set of laser-beam welding devices in order to introduce the at least four welding devices into at least four new cells of the grid.

2. The method according to claim 1, wherein four laser-beam welding devices are introduced into four parallelepipedal cells of square cross-section and having a square arrangement of the grid, such that each welding device aligns a welding laser beam along a bisector plane of the cell into which the device is introduced, containing a diagonal of the square around which the four cells of the set of cells are arranged, the four edges along which welding is carried out constituting the edges of a parallelepiped of square cross-section.

3. The method according to claim 2, wherein the four cells into which the four welding devices are introduced are arranged around a square, the length of a side of which is an integer multiple of the side of a cell of the grid.

4. The method according to claim 3, wherein the four cells into which the four welding devices are introduced are arranged around a square, the length of a side of which is twice the side of a cell of the grid.

5. The method according to claim 2, wherein the four cells into which the four welding devices are introduced are arranged around a square, the length of a side of which is equal to the side of a cell of the grid.

6. The method according to any one of claims 2 to 5, wherein relative movement between the grid and the welding devices is carried out between two welding operations, in one of two directions perpendicular to axes of the cells of the grid, with an amplitude equal to twice the length of a side of a cell of the grid.

7. The method according to any one of claims 2 to 5, wherein relative movement between the grid and the welding devices is carried out between two welding operations, in one of two directions perpendicular to axes of the cells of the grid, with an amplitude equal to the length of a side of a cell of the grid, the welding operations being performed successively in the vicinity of a first face and a second face of the grid.

8. The method according to any one of claims 2 to 5, wherein, in order to carry out successive welding of the edges of the cells of the grid, relative movement between the grid and the welding devices is carried out in a plane perpendicular to axes of the cells of the grid, along a spiral path starting from a central zone of the grid.

9. An installation for welding interlaced straps of a spacer grid of a fuel assembly for a nuclear reactor, defining juxtaposed parallelepipedal cells of square cross-section, to constitute a lattice in which four adjacent cells have a common edge along which two straps constituting a cross-brace are assembled and welded, said installation comprising, in a leaktight enclosure, (a) a horizontal support for receiving the grid in a horizontal arrangement in which axes and edges of the cells of the grid are vertical;

(b) a welding head on which are fixed four substantially cylindrical laser-beam devices arranged on the welding head such that their axes are parallel and arranged along the edges of a parallelepiped with square base;

(c) means for moving the welding head up and down in both directions; and (d) means for relative movement of the support of the grid and of the welding head in two directions at 90° to each other in a horizontal plane.

10. The installation according to claim 9, wherein the horizontal support of the spacer grid is mounted on a displacement device with carriages having crossed movements in two perpendicular directions in the horizontal plane.

11. The installation according to claim 9 or 10, wherein each of the four laser-beam welding devices of the welding head includes a tubular body in which are arranged, successively along the axis of the tubular body, an optical fiber for supplying laser radiation, a set of collimating lenses, a set of focusing lenses and a mirror having a surface which is inclined relative to the axis of the tubular body of the welding device, through which tubular body a window passes in a lateral arrangement relative to the mirror.

12. The installation according to claim 11, wherein the optical fiber is connected to a means for supplying laser radiation.

13. The installation according to claim 12, wherein each of the laser-beam welding devices includes a nozzle for supplying inert gas to an internal bore of the tubular body of the welding device.

* * * * *

UNITED STATES PATENT AND TRADEMARK OFFICE
CERTIFICATE OF CORRECTION

PATENT NO. : 5,726,418
DATED       : March 10, 1998
INVENTOR(S) : Dominique DUTHOO et al.

It is certified that error appears in the above-identified patent and that said Letters Patent is hereby corrected as shown below:

On the title page, item:

[73] Change "Corbevoie" to --Courbevoie--

Signed and Sealed this

Eleventh Day of August 1998

Attest:

BRUCE LEHMAN

Attesting Officer

Commissioner of Patents and Trademarks